United States Patent [19]

Cook

[11] 3,958,021

[45] May 18, 1976

[54] COATING FRUIT PIECES WITH LIQUID SHORTENING TO STABILIZE AGAINST DEGRADATION AND DISCOLORATION

[75] Inventor: Milton L. Cook, Algonquin, Ill.

[73] Assignee: The Quaker Oats Company, Chicago, Ill.

[22] Filed: Feb. 18, 1975

[21] Appl. No.: 550,780

Related U.S. Application Data

[63] Continuation-in-part of Ser. No. 465,108, April 29, 1974, abandoned.

[52] U.S. Cl. .............................. 426/268; 426/270; 426/293; 426/307; 426/310
[51] Int. Cl.² ............................................. A23B 7/16
[58] Field of Search ........................... 426/302–307, 426/615, 262, 268, 270, 308–310, 291, 293, 321

[56] References Cited

UNITED STATES PATENTS

| | | | |
|---|---|---|---|
| 2,834,681 | 5/1958 | Kreager | 426/615 |
| 3,798,338 | 3/1974 | Galle | 426/307 |

*Primary Examiner*—Norman Yudkoff
*Assistant Examiner*—Martin G. Mullen
*Attorney, Agent, or Firm*—Mathew R. P. Perrone, Jr.

[57] ABSTRACT

A process is disclosed for producing a stable hydrophilic food product such as a fruit piece. The process comprises preparing a liquid shortening by heating the shortening to a temperature above the melting point thereof, heating fruit pieces above the temperature of the melting point of the shortening, admixing the fruit pieces and shortening until the shortening completely coats the fruit pieces, and cooling the coated fruit pieces.

6 Claims, No Drawings

COATING FRUIT PIECES WITH LIQUID SHORTENING TO STABILIZE AGAINST DEGRADATION AND DISCOLORATION

CROSS-REFERENCE TO RELATED APPLICATIONS

This application is a continuation-in-part of U.S. Pat. application Ser. No. 465,108 filed Apr. 29, 1974 and now abandoned.

BACKGROUND OF THE INVENTION

FIELD OF THE INVENTION

This invention relates to a stable fruit piece.

DESCRIPTION OF THE PRIOR ART

Many attempts have been made to produce stabilized hydrophilic products such as fruit pieces which are stable against degradation and discoloration and which may be used as individual pieces and nuggets in cooking of food products. Many attempts have also been made to provide stabilized fruit pieces or other hydrophilic products which are stable against water absorption and the consequent loss of texture due to such water absorption. This invention overcomes the problems associated with such prior attempts.

SUMMARY OF THE INVENTION

It is an object of this invention to provide a process for producing a shelf stable, hydrophilic product such as a fruit piece which is stable against discoloration and oxidation and yet which is an individual product.

It is another object of this invention to provide a stabilized hydrophilic food product such as a fruit piece which is stable against water absorption, that is, that resists or delays the hydrophilic properties of the food product.

The objects of this invention are accomplished by a process for producing a stable hydrophilic food product, said process comprising:

A. preparing a liquid shortening by heating the shortening to a temperature above the melting point thereof, said shortening having a melting point of from about 125°F. to 135°F.;

B. heating a quantity of hydrophilic food product above the temperature of the melting point of the shortening;

C. admixing the food product and shortening until the shortening completely coats the fruit pieces; and D. cooling the coated food product.

The objects of this invention are further accomplished by a process in which the shortening comprises from about 4% to about 10% by weight of the coated food product.

The food product of this invention which is coated is a hydrophilic. This hydrophilic food product provides certain types of flavors for the individual food composition in which this hydrophilic product is used. A coating of shortening as set forth above stabilizes the food product and permits it to be used in the food in which it is intended to be used. For example, a coating as set forth in this invention can be applied to a compressed blueberry tablet containing about 85% sugar, about 9% blueberry powder, about 2% blackberry powder, and about 4% fat. This process can also be applied to dry fruit. Primarily as a protection against moisture pickup and secondly for maintaining free-flowing characteristics essential to mass food production. This free-flowing coated food product can be nutmeats, hard candy, compressed maple or sugar tablets, or any other fruit tablets which have been coated by the process of this invention, in addition to the dried fruit pieces and blueberry tablets discussed above. Basically, the food product to be coated by this invention is hydrophilic and in particle or granular form. The coating by the process of this invention stabilizes the resultant food product for use in a mass production of a further food product. food The particle sizes of the food product being coated range up to about ½-inch in diameter. Preferably, however, the particle size being coated is about ¼-inch in diameter. This size is preferred because it provides efficient mass production of a batter incorporating the particles of this invention. Preferred fruit pieces are apples. Hereafter for purposes of discussion, references to fruit pieces or apples is deemed to include the above-named particles also.

Also preferably a flavoring agent is added to the process at the point of admixing after the shortening is coated on the food product, and preferably the flavoring agent is cinnamon.

The first step of this invention comprises preparing a liquid shortening by heating the shortening to a temperature above the melting point thereof. By use herein of the term "shortening" it is intended to mean shortening as it is commonly used in the food industry and is commonly recognized by people well skilled in the baking and cooking industry. The shortening utilized in this invention, however, must be one having a melting point between about 125°F. and 135°F. The shortening is liquified by heating it to a temperature above the melting point thereof.

The next step in this invention requires heating fruit pieces above the temperature of the melting point of the shortening. The fruit pieces should be heated to a temperature such that when added with the shortening they will not immediately solidify the shortening by decreasing the temperature thereof in order to make the coating more thorough and complete. It is obvious that in heating the fruit pieces one need only heat them above the melting point of the shortening and any additional heating would not be desirable if it tended to degrade the fruit pieces. After the fruit pieces are heated above the temperature of the melting point of the shortening, the fruit pieces and shortening are mixed together until the shortening completely coats the fruit pices. After this coating is completed, the coated fruit pieces are cooled and then are stable against degradation. It may be desirable to add some type of flavoring agent or spices or the like, as well as a coloring agent in the process after the shortening has been coated onto the fruit pieces. In such a case the additive would also be coated equally among and on the fruit pieces. Preferably it is preferred to use apples as the fruit with cinnamon as a flavoring agent thereby giving an apple/cinnamon flavor.

DESCRIPTION OF THE PREFERRED EMBODIMENTS

This invention may be more fully described but is not limited by the following example.

EXAMPLE

A shortening having a melting point of approximately 130°F. was heated until it became melted into a clear liquid. Apple granules were placed in an enrober and heated to a temperature of 135°F. while tumbling. The shortening was slowing added to the tumbling apples for 5 minutes with heating being supplied thereto to keep the shortening above the melting point thereof. Cinnamon was then added to the coated apple pieces. A coolant was applied to the exterior of the enrober and the product was tumbled while cooled to provide coated apple pieces. In this example the granulated dried apples comprised about 92 percent of the total product, the cinnamon about 3 percent of the total product, and the shortening about 5 percent of the total product. The coated apple particles were stable and resisted absorption of water.

Having fully described this new and unique invention, I claim:

1. A process for producing a stable fruit piece, said process comprising:
    a. preparing a liquid shortening by heating shortening to a temperature above the melting point thereof to liquefy the shortening, the shortening having a melting point of from about 125°F. to 135°F.;
    b. heating fruit pieces to a temperature which is above the temperature of the melting point of the shortening, which is below the degrading point of the fruit pieces, and which prevents congealing of said shortening on contact of the shortening with the fruit pieces;
    c. admixing the fruit pieces and shortening while tumbling the fruit pieces until the shortening completely coats the food product particles and comprises 4% to 10% by weight of the fruit pieces;
    d. adding a flavoring agent to the coated fruit pieces, and
    e. cooling the coated fruit pieces.

2. A process as in claim 1 wherein the fruit pieces comprise apples.

3. A process as in claim 2 wherein the flavoring agent is cinnamon.

4. A process as in claim 3 wherein the shortening has a melting point of approximately 130°F.

5. A process as in claim 4 wherein the apples are heated to a temperature of 135°F. while tumbling.

6. A process as in claim 5 wherein:
    a. the apples comprise about 92 percent by weight of the total product;
    b. the cinnamon comprises about 3 percent by weight of the total product; and
    c. the shortening comprises about 5 percent by weight of the total product.

* * * * *